3,558,344
CARBONACEOUS COATING FOR CARBON FOAM
George R. Peterson, Andersonville, and Clifton E. Stooksbury, Clinton, Tenn., assignors to the United States of America as represented by the United States Atomic Energy Commission
No Drawing. Filed Apr. 19, 1968, Ser. No. 722,537
Int. Cl. B44d 1/09
U.S. Cl. 117—46                     5 Claims

ABSTRACT OF THE DISCLOSURE

The structural integrity of high- or low-density carbon foam is improved by providing the latter with a protective carbonaceous coating. The protective coating is provided by applying to exposed surfaces of a carbon foam structure a mixture of graphite flour and a thermoplastic resin dissolved in a suitable solvent. The coating mixture is dried at a relatively low temperature to remove excess solvent and then heated to a temperature sufficient to carbonize the resin and form the coating.

---

The present invention relates generally to protective coatings for carbon foams and more particularly to a method of providing carbon foam structures with a carbonaceous coating for providing the latter with an adherent, abrasion-resistant surface. This invention was made in the course of, or under, a contract with the U.S. Atomic Energy Commission.

Cellular or porous bodies formed of carbonized organic materials have been found to be particularly useful in high temperature applications as thermal insulators and in applications where the excellent strength-to-weight ratios of the carbonized cellular bodies may be advantageously employed. These carbonized cellular bodies, commonly and hereinafter referred to as carbon foams, are producible in selected densities ranging from a low density of about 0.02 gm./cc. up to a high density of about 1.0 or more gm./cc. so as to be more suitable for the particular envisioned usage.

While carbon foam possesses properties and characteristics which render it particularly useful as strong, lightweight structural material, it also possesses an inherently fragile property which significantly detracts from its usefulness in many applications. Carbon foam, particularly foam in the lower densities, is sufficiently fragile that breakage, abrasion, or crumbling of the foam is troublesome and is a fairly common occurrence during handling, assembly, and storage of finished carbon foam structures.

Accordingly, it is an object of the present invention to provide carbon foam bodies or structures with protective coatings capable of maintaining the structural integrity of the carbon foam.

Another object of the present invention is to provide carbon foam with a carbonaceous covering which forms a smooth, adherent, and abrasion-resistant coating on the carbon foam.

A further object of the present invention is to provide a method for covering high- or low-density carbon foam with a carbonaceous coating capable of substantially minimizing breakage, abrasion, or crumbling of the underlying carbon foam.

Other and further objects of the invention will be obvious upon an understanding of the illustrative method about to be described, or will be indicated in the appended claims, and various advantages not referred to herein will occur to one skilled in the art upon employment of the invention in practice.

Briefly, the present invention contemplates the formation of a carbonized coating on selected surface portions of a carbon foam structure or product for the purpose of protecting the coated areas from damage. The method for providing the desired carbonaceous coating generally comprises the steps of preparing a coating mixture by blending together a thermoplastic resin dissolved in a suitable solvent and a quantity of graphite flour, applying the coating mixture to selected surface portions of a carbon foam product, volatilizing excess solvent from the mixture, and thereafter heating the coated assembly to a temperature sufficient to convert the thermoplastic resin to carbon.

Any suitable aromatic, thermoplastic resin may be employed in the fabrication of the novel carbon foam coatings of the present invention. For example, satisfactory results have been obtained by using a coal tar pitch having a softening point at a temperature of about 90–95° C. and a specific gravity of about 1.26 to 1.32. While resins having softening points at temperatures lower than about 100° C. are preferable, satisfactory results may be achieved with resins having softening points as high as about 200° C. The resin employed in the coating mixture is necessarily a thermoplastic resin, since this type of resin possesses the properties required for providing the desired coating. For example, in order to assure that the coating will not pull away or shrink excessively during the carbonization of the coating mixture, the resin must soften at relatively low temperatures and remain soft, i.e., in a somewhat plastic or liquid state, during further temperature increases until a temperature is reached at which the resin is converted to carbon. Also, the resin must have approximately the same coefficient of expansion as the carbon foam at a time when carbonizing begins to occur.

Thermosetting resins, i.e., resins of the type which harden or set when subjected to temperature increases, are not applicable for providing the protective carbon foam coating of the present invention since these resins usually have an excessive shrinkage factor during the carbonizing step which causes the coating to actually pull away from the carbon foam and thereby leave excessive and deleterious gaps and fractures in the coating. Another problem involved in the use of thermosetting resins is due to the fact that the coating would shear the underlying cellular structure or foam during the coking or carbonizing operation.

As briefly mentioned above, the thermoplastic resin is dissolved to a somewhat liquidus state prior to its application onto the desired surface portions of the carbon foam. The dissolution of the resin may be accomplished by using any suitable aromatic solvent which is volatile at relatively low temperatures, e.g., in the order of about 150° C., and which, of course, is capable of dissolving the particular resin being employed. For example, a type of solvent found to be satisfactory with coal tar resins is benzene. However, a solvent such as chloroform or ether may also be used to dissolve coal tar resins.

The coating mixture or composition includes a quantity of a suitable filler material such as graphite flour for the purpose of filling the pores or cells in the surface layer of the carbon foam. By using such a filler material in the coating mixture, the carbonized coating provided on the carbon foam substrate is a smooth and crack-free coating which assures the structural integrity of the coating and the underlying carbon foam. The use of a dissolved thermoplastic resin without a suitable filler material to fill the carbon foam cells would not provide a satisfactory coating since the resin is apparently absorbed into the carbon foam by capillary attraction so as to prevent the formation of a coating. The size of the individual cells is a determining factor for the size of the graphite flour used in the mixture. In other words, if the carbon foam contains relatively small cell openings, then the preferred filler consists of relatively small particles of graphite flour; for example, graphite flour of a size in the order of about 5 microns is satisfactory for even very small cell openings. However, if the cell openings in the carbon foam are fairly large, additional filler material such as natural graphite flakes may be added to the mixture along with the graphite flour.

In applying the coating mixture to the carbon foam substrate, the resin is preferably first dissolved to a liquid state which permits relatively easy admixture or blending with the graphite flour and, in some instances, graphite flakes. After blending the dissolved resin and filler material, the resulting coating mixture may be applied to the carbon foam in any suitable manner such as by brushing, troweling, or spraying. The viscosity of the coating mixture may be selectively varied for rendering it most appropriate for the particular type of application desired. The viscosity of the mixture may be readily adjusted by adding selected quantities of solvent to the coating mixture or by using a smaller quantity of solvent during the initial dissolution of the resin.

In order to assure that blisters or bubbles will not occur in the coating on the carbon foam, all, or substantially all, of the moisture is preferably removed from the carbon foam prior to the application of the coating mixture. This moisture may be satisfactorily removed by drying the carbon foam structure to be coated overnight at a temperature of about 150° C.

After the coating mixture is applied on appropriate surfaces of the carbon foam, excess solvent is removed from the coating mixture by a "drying" operation. This drying operation, in effect, cures the coating mixture. With solvents having relatively low volatilization temperatures the drying may be accomplished at a temperature of about 150° C. for a duration of about one hour.

The coating thickness may be selectively varied by adjusting the viscosity of the mixture, type of application, or by applying several relatively thin coatings to the foam substrate with the drying or curing cycles between each coat. Also, the thickness of the coating varies inversely with the density of the foam. In other words, as the density of the foam increases, the thickness of the coating decreases. As the coating thickness increases, greater care must be exercised in the carbonizing step and also longer carbonizing cycles may be required to prevent cracking or spalling of the coating and, possibly in some instances, the fracture of the carbon foam substrate. The conversion of the thermoplastic resin to carbon may be accomplished by placing the carbon foam with the coating mixture thereon in a suitable furnace and, under the influence of an inert atmosphere, e.g., argon, heating the coated assembly to a temperature of about 1000° C. The duration of this heating step is preferably about 24 hours or longer to assure complete carbonization of the resin.

The properties and characteristics of the novel coating of the present invention provide features whereby carbon foam usage may be considerably enhanced. The coating is very adherent with the carbon foam substrate and will not curl or pull loose from the latter, even when subjected to considerable abuse. The coating provides a very smooth surface on the foam that exhibits no cracks. Another advantage of the coating is that it is resistant to abrasive forces which would normally remove surface portions of unprotected carbon foam.

The present invention will be better understood from the following description by way of example, which is given for purposes of illustration and is not intended to limit the invention.

EXAMPLE

In a preferred form of the present invention the method of applying the carbonaceous coating to a carbon foam substrate having a density of about 0.05 gram per cubic centimeter comprises the steps of dissolving coal tar pitch having a specific gravity of 1.28 and a softening point of about 90° C. with benzene. The quantity of pitch amounts to 40 parts per hundred of graphite flour (—5 micron particle size). The viscosity of the mixture is then adjusted to a somewhat liquidus state, which permits its application onto the carbon foam by a conventional brush. Excess benzene is then removed from the coating mixture by drying the foam-coated specimen for a period of one hour at a temperature of 150° C. The dried or cured coating mixture is then carbonized at a temperature of 1000° C. in an argon atmosphere for a duration of 30 hours to provide the carbonaceous coating. Starting at approximately room temperature, the rate of heat-up of the coating mixture to the carbonizing temperature is from room temperature to 200° C. at a rate of increase of 70° C. per hour, then to 550° C. at a rate of 15° C. per hour, and then to 1000° C. or the carbonizing temperature at a rate of 100° C. per hour.

It will be seen that the present invention provides a highly advantageous protective coating for carbon foam without size limitation with respect to the foam density, pore or cell sizes, structures, etc. The coating of the present invention provides a smooth, abrasion-resistant surface on carbon foam parts which is capable of eliminating the heretofore deleterious erosion of the carbon foam, improves scratch resistance, reduces friction characteristics or coefficient, and facilitates maintenance of dimensional tolerances which would significantly add to the utility of the carbon foam. For example, carbon foam structures may be machined to fairly close tolerances and then be provided with the carbonaceous coating of the present invention to assure that the structure maintains this desired configuration during subsequent handling and assembly operations.

As various changes may be made in the types of thermoplastic resins and their solvents, filler materials, and variations in the method steps without departing from the spirit and scope of the invention and without sacrificing any of its advantages, it is to be understood that all matter herein is to be interpreted as illustrative and not in a limiting sense.

What is claimed is:

1. A method of providing a cellular structure consisting essentially of carbon with a smooth and abrasion-resistant protective carbonaceous coating, comprising the steps of applying to selected surface portions of the cellular structure a coating mixture comprising an aromatic thermoplastic resin dissolved in a solvent therefor and a particulate carbonaceous filler material composed of at least one of the group consisting of graphite flour and natural graphite flakes, said particulate filler material being in a size range adequate to be received in cell openings of said cellular structure, removing excess solvent from the coating mixture, and thereafter heating the coated assembly in an inert atmosphere to a temperature sufficient to carbonize the thermoplastic resin and thereby form the protective carbonaceous coating, said coating characterized by being crack-free and by its tenacious adherence with the underlying cellular structure.

2. The method claimed in claim 1, wherein the quantity of the particulate filler material in the coating mixture is sufficient to fill open cells in the cellular structure contacted by the coating mixture to the extent necessary to provide the tenacious adherence with the cellular structure.

3. The method claimed in claim 1, wherein the thermoplastic resin is dissolved to a liquid state prior to admixture with the filler material, and wherein the viscosity of the coating mixture is selectively controlled by additional quantities of the solvent to facilitate the application of the coating mixture onto said surface portions of the cellular structure.

4. The method claimed in claim 1, wherein the solvent volatilizes at a temperature substantially lower than the carbonizing temperature of the thermoplastic resin, and wherein the excess solvent is removed from the coating mixture by heating the coated assembly at a temperature sufficient to effect the volatilization of the solvent.

5. The method claimed in claim 4, wherein the thermoplastic resin is a coal tar pitch having a softening point at a temperature in the range of about 90° to 95° C. and a specific gravity in the range of about 1.26 to 1.32, the solvent is benzene.

References Cited

UNITED STATES PATENTS

| | | |
|---|---|---|
| 1,594,810 | 8/1926 | Benner et al. |
| 2,597,963 | 5/1952 | Winter. |
| 2,962,386 | 11/1960 | Doll et al. _____ 117—46 |
| 2,972,552 | 2/1961 | Winter _____ 117—46 |

ALFRED L. LEAVITT, Primary Examiner

W. E. BALL, Assistant Examiner

U.S. Cl. X.R.

117—98